(12) United States Patent
Kim et al.

(10) Patent No.: US 10,158,129 B2
(45) Date of Patent: Dec. 18, 2018

(54) FLUID EXCHANGE MEMBRANE MODULE

(71) Applicant: KOLON INDUSTRIES, INC., Gwacheon-si, Gyeonggi-do (KR)

(72) Inventors: Kyoung Ju Kim, Yongin-si (KR); Young Seok Oh, Yongin-si (KR); Jin Hyung Lee, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 146 days.

(21) Appl. No.: 15/025,089

(22) PCT Filed: Sep. 29, 2014

(86) PCT No.: PCT/KR2014/009139
§ 371 (c)(1),
(2) Date: Mar. 25, 2016

(87) PCT Pub. No.: WO2015/047007
PCT Pub. Date: Apr. 2, 2015

(65) Prior Publication Data
US 2016/0240870 A1   Aug. 18, 2016

(30) Foreign Application Priority Data
Sep. 30, 2013   (KR) .......... 10-2013-0116305

(51) Int. Cl.
*B01F 3/04*       (2006.01)
*H01M 8/04119*    (2016.01)
(Continued)

(52) U.S. Cl.
CPC ........ *H01M 8/04149* (2013.01); *B01D 63/02* (2013.01); *B01D 63/08* (2013.01);
(Continued)

(58) Field of Classification Search
CPC ...... B01D 53/228; B01D 63/02; B01D 63/08; B01D 71/68; B01F 3/04241;
(Continued)

(56) References Cited

U.S. PATENT DOCUMENTS 4,355,636 A * 10/1982 Oetjen ................. A61M 16/16
                                                        128/204.13
7,624,971 B2 * 12/2009 Terasaki ............ H01M 8/04149
                                                        261/104
(Continued)

FOREIGN PATENT DOCUMENTS

CN    101663083 A    3/2010
CN    102648547 A    8/2012
(Continued)

OTHER PUBLICATIONS

European Patent Office, Supplementary European Search Report dated Apr. 10, 2017 by the European Patent Office in copending European Application No. 14 85 0035.
(Continued)

*Primary Examiner* — Charles S Bushey
(74) *Attorney, Agent, or Firm* — Sughrue Mion, PLLC (57) ABSTRACT

A fluid exchange membrane module includes a case including at least two pairs of fluid inlets and fluid outlets, and a fluid exchange membrane installed within the case and disposed so that a dry fluid flowing between one pair of a fluid inlet and a fluid outlet does not directly contact a high-humidity fluid flowing between another pair of a fluid inlet and a fluid outlet in the operating state of the module. The fluid inlet for the high-humidity fluid includes a diffuser. The fluid exchange membrane module may adiabatically expand a fluid flowing toward one side of a fluid exchange membrane and thus increase the relative humidity of the high-temperature and high-humidity fluid so as to maximize fluid transmission through the fluid exchange membrane,
(Continued)

and may decrease the pressure of the fluid so as to uniform pressure distribution of a fluid flow.

22 Claims, 6 Drawing Sheets

(51) Int. Cl.
*H01M 8/0289* (2016.01)
*B01D 63/02* (2006.01)
*B01D 63/08* (2006.01)
*B01D 71/68* (2006.01)
*H01M 8/04089* (2016.01)
*B01D 53/22* (2006.01)
*C02F 1/44* (2006.01)

(52) U.S. Cl.
CPC .......... *B01D 71/68* (2013.01); *B01F 3/04241* (2013.01); *H01M 8/0289* (2013.01); *H01M 8/04104* (2013.01); *B01D 53/228* (2013.01); *B01F 2003/04319* (2013.01); *C02F 1/44* (2013.01)

(58) Field of Classification Search
CPC ............ B01F 2003/04319; C02F 1/44; H01M 8/0289; H01M 8/04104; H01M 8/04149
USPC ......................................................... 261/104
See application file for complete search history.

(56) References Cited

U.S. PATENT DOCUMENTS

| | | | | |
|---|---|---|---|---|
| 8,528,883 | B2 | 9/2013 | Lee | |
| 9,160,015 | B2* | 10/2015 | Kim | .................. H01M 8/04149 |
| 2001/0021467 | A1* | 9/2001 | Suzuki | ............... H01M 8/04119 429/413 |
| 2005/0110172 | A1* | 5/2005 | Tanaka | ................... B01D 63/02 261/104 |
| 2005/0121812 | A1* | 6/2005 | Okada | ................... B01D 53/22 261/104 |
| 2005/0247200 | A1 | 11/2005 | Berger et al. | |
| 2005/0275120 | A1* | 12/2005 | Sasamoto | ............... H01M 8/02 261/104 |
| 2012/0231357 | A1 | 9/2012 | Kim et al. | |
| 2012/0282533 | A1* | 11/2012 | Kim | .................. H01M 8/04149 429/413 |

FOREIGN PATENT DOCUMENTS

| | | |
|---|---|---|
| DE | 10 2004 022 312 | 9/2005 |
| EP | 2 153 882 | 2/2010 |
| JP | 8-57266 A | 3/1996 |
| JP | 2002-147802 A | 5/2002 |
| JP | 2002-298895 A | 10/2002 |
| JP | 2005-319462 A | 11/2005 |
| JP | 2005-321188 A | 11/2005 |
| JP | 2009-199741 A | 9/2009 |
| KR | 10-2005-0035334 A | 4/2005 |
| KR | 10-2009-0013304 A | 2/2009 |
| KR | 10-2009-0100437 A | 9/2009 |
| KR | 10-2012-0102988 A | 9/2012 |
| KR | 10-2013-0009031 A | 1/2013 |
| WO | 2013/137310 A1 | 9/2013 |

OTHER PUBLICATIONS

International Searching Authority, International Search Report for PCT/KR2014/009139 dated Dec. 11, 2014 [PCT/ISA/210].
International Searching Authority, Written Opinion for PCT/KR2014/009139 dated Dec. 11, 2014 [PCT/ISA/237].
State Intellectual Property Office of the P.R.C. dated Apr. 26, 2017 in counterpart application No. 201480054198.X.
Japanese Patent Office; Communication dated Mar. 21, 2017 in counterpart application No. 2016-518673.
State Intellectual Property Office of the P.R.C., Communication dated Jan. 19, 2018 in counterpart application No. 201480054198.X.
State Intellectual Property Office of People's Republic of China, Communication dated Aug. 22, 2018 in counterpart Application No. 201480054198.X.

* cited by examiner

FLUID EXCHANGE MEMBRANE MODULE

CROSS REFERENCE TO RELATED APPLICATIONS

This application is a National Stage of International Application No. PCT/KR2014/009139 filed Sep. 29, 2014, claiming priority based on Korean Patent Application No. 10-2013-0116305 filed Sep. 30, 2013.

TECHNICAL FIELD

The present invention relates to a fluid exchange membrane module, and more particularly to a fluid exchange membrane module which may maximize fluid transmission through a fluid exchange membrane simply by including a simple member or changing the shape of a flow path, and uniformize pressure distribution of a fluid flow.

The fluid exchange membrane module may be a moisture supply module, a heat exchange module, a gas separation module or a water treatment module.

BACKGROUND ART

In general, fuel cells are power generation type cells which generate electricity by combining hydrogen with oxygen. Fuel cells may continuously produce electricity as long as hydrogen and oxygen are supplied, differently from general chemical cells, such as batteries or storage batteries, and have no thermal loss, thus having 2 times the efficiency of internal combustion engines. Further, fuel cells convert chemical energy, generated by combination of hydrogen and oxygen, directly into electric energy, thus emitting a small amount of pollutants. Therefore, fuel cells are eco-friendly and may reduce worry about exhaustion of resources due to increase in energy consumption. Such fuel cells may be classified into a polymer electrolyte membrane fuel cell (PEMFC), a phosphoric acid fuel cell (PAFC), a molten carbonate fuel cell (MCFC), a solid oxide fuel cell (SOFC), an alkaline fuel cell (AFC) and the like according to kinds of electrolytes to be used. These respective fuel cells are basically operated by the same principle but are different in terms of kinds of used fuels, operating temperatures, catalysts, electrolytes and the like. Thereamong, since a PEMFC is operated at a low temperature, as compared to other fuel cells, and has a high power density and may thus be minimized, it is known that the PEMFC is the most useful in transportation systems as well as small mount-type power generation equipment.

One of the most important factors to improve performance of the PEMFC is to maintain a water content by supplying moisture of a designated amount or more to a polymer electrolyte membrane or proton exchange membrane (PEM) of a membrane electrode assembly (MEA). The reason for this is that, if the polymer electrolyte membrane is dry, power generation efficiency is rapidly lowered. In order to humidify the polymer electrolyte membrane, there are 1) a bubbler humidification method in which a pressure resistant container is filled with water and moisture is supplied by causing a target gas to pass through a diffuser, 2) a direct injection method in which an amount of moisture required for reaction of a fuel cell is calculated and moisture is supplied directly to a gas flow pipe through a solenoid valve based on the calculated amount of moisture, 3) a humidifying membrane method in which moisture is supplied to a fluidized bed of gas using a polymer separation membrane, and the like. Among these methods, the humidifying membrane method, in which a polymer electrolyte membrane is humidified by providing vapor to gas supplied to the polymer electrolyte membrane using a membrane selectively transmitting only vapor included in exhaust gas, may reduce the weight and size of a humidifier, thus being advantageous.

As a selectively preamble membrane used in the humidifying membrane method, a hollow fiber membrane having a large transmission area per unit volume may be used or a flat sheet membrane being advantageous in terms of acquisition of a uniform fluid flow may be used. A moisture supply apparatus to which a hollow fiber membrane is applied may be desirably used in a fuel cell system having a high capacity of 100 kW or more, which requires high integration, and any type of membrane may be used in a general fuel cell system having a capacity of 50 kw or less.

Technical development up to now has been concentrated upon improvement in efficiency of a selectively preamble membrane so as to achieve high integration of a humidifying membrane-type moisture supply module, but the present invention adds a physical device to a moisture supply module so as to maximize moisture transmission efficiency and to achieve high integration and manufacturing cost reduction effects therethrough.

PRIOR ART DOCUMENT

[Patent Document]
Korean Patent Publication No. 10-200900013304 (Publication Date: Feb. 5, 1009)

DISCLOSURE

Technical Problem

Therefore, the present invention has been made in view of the above problems, and it is an object of the present invention to provide a fuel exchange membrane module which expands a fluid flowing toward one side of a fuel exchange membrane and may thus increase relative humidity of the high-temperature and high-humidity fluid to maximize fluid transmission through the fluid exchange membrane, and reduce pressure of the fluid to uniformize pressure distribution of a fluid flow.

Technical Solution

In accordance with an aspect of the present invention, the above and other objects can be accomplished by the provision of a fluid exchange membrane module including a case including at least two pairs of fluid inlets and fluid outlets, and a fluid exchange membrane installed within the case and disposed so that a dry fluid flowing between one pair of a fluid inlet and a fluid outlet does not directly contact a high-humidity fluid flowing between another pair of a fluid inlet and a fluid outlet in the operating state of the fluid exchange membrane module.

The fluid inlet for the high-humidity fluid includes a diffuser.

The diffuser may be installed at pipes connected to the fluid inlets.

The diffuser may include a first inner diameter part and a second inner diameter part having different inner diameters.

The inner diameter of the second inner diameter part may be greater than the inner diameter of the first inner diameter part.

The first inner diameter part may be disposed at an upstream region of a fluid flow and the second inner diameter part may be disposed at a downstream region of the fluid flow.

The ratio of the inner diameter of the second inner diameter part to the inner diameter of the first inner diameter part may be 2:1 to 20:1.

The diffuser may further include an inner diameter extension part located between the first inner diameter part and the second inner diameter part.

The inner diameter of the inner diameter extension part may be gradually increased from the inner diameter of the first inner diameter part to the inner diameter of the second inner diameter part.

The diffuser may have a Venturi tube shape, and the inner diameter of the first inner diameter part may be gradually decreased.

The ratio of a length at which the inner diameter of the inner diameter extension part is gradually increased to a length at which the inner diameter of the first inner diameter part is gradually decreased may be 1:1 to 10:1.

The first inner diameter part may be an orifice plate.

The orifice plate may include a plate including at least one opening, and the ratio of the inner diameter of the second inner diameter part to the diameter of the opening may be 3:1 to 30:1.

The first inner diameter part may be a nozzle, and the inner diameter of the first inner diameter part may be gradually decreased.

The fluid exchange membrane module may further include an adiabatic member configured to thermally insulate the diffuser.

The fluid exchange membrane may be formed as a hollow fiber membrane, and the case and the fluid exchange membrane may be disposed such that the dry fluid flows through hollows of the hollow fiber membrane and the high-humidity fluid flows outside the hollow fiber membrane.

The case may include an inlet case provided with a first fluid inlet, an outlet case provided with a first outlet, and a connection case provided with a second fluid inlet and a second fluid outlet, the case may have a connection structure in which the inlet case and the outlet case are connected by the connection case, and hollow fibers may be disposed within the case such that one end of each of the hollow fibers in the length direction is located at the inlet case and the other end of each of the hollow fibers is located at the outlet case.

Potting parts to fix the hollow fibers may be installed at both ends of the connection case.

The fluid exchange membrane may be formed as a flat sheet membrane, and the case and the fluid exchange membrane may be disposed such that the dry fluid flows along one surface of the flat sheet membrane and the high-humidity fluid flows along the other surface of the flat sheet membrane.

The case may have an inner space formed therein and be provided with two pairs of fluid inlets and fluid outlets so that fluids are supplied from the outside of the case to the inner space and the fluids are discharged from the inner space to the outside of the case, and the fluid exchange membrane may be disposed within the case such that the circumference of the flat sheet membrane contacts the inner wall of the case so as to divide the inner space of the case into two sub-spaces, one sub-space of the two sub-spaces is connected to one pair of a fluid inlet and a fluid outlet and the other sub-space is connected to another pair of a fluid inlet and a fluid outlet.

The fluid exchange membrane module may be any one of selected from the group consisting of a moisture supply module, a heat exchange module, a gas separation module and a water treatment module.

Advantageous Effects

The fluid exchange membrane module of the present invention may adiabatically expand a fluid flowing toward one side of a fluid exchange membrane and thus increase the relative humidity of the high-temperature and high-humidity fluid, thereby maximizing fluid transmission through the fluid exchange membrane.

Further, the fluid exchange membrane module may decrease the pressure of the fluid and thus uniformize pressure distribution of a fluid flow, thereby causing the fluid to uniformly contact the entirety of the fluid exchange membrane and thus improving efficiency of the fluid exchange membrane module.

The above-described effects may be achieved simply by including a simple member or changing the shape of a flow path without addition of a separate device. Thereby, a moisture supply module for humidifying membrane-type fuel cells requiring downsizing and lightweight may be manufactured and economic efficiency may be assured.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the annexed drawings. However, the present invention may be implemented as various different types and is not limited to the embodiments of the present invention which will be described below.

A fluid exchange membrane module in accordance with one embodiment of the present invention includes a case and a fluid exchange membrane installed in the case.

The fluid exchange membrane module is operated so as to exchange a fluid, such as moisture or heat, between at least two kinds of fluids through a fluid exchange membrane located between the two kinds of fluids. Therefore, at least two pairs of fluid inlets and fluid outlets may be formed on the case. Further, the fluid exchange membrane may be disposed within the case so that the two kinds of fluids do not directly contact each other. That is, the fluid exchange membrane may be disposed within the case so that a dry fluid flowing between a pair of a fluid inlet and a fluid outlet does not directly contact a high-humidity fluid flowing between another pair of a fluid inlet and a fluid outlet in the operating state of the fluid exchange membrane module. In the specification, the state in which the dry fluid and the high-humidity fluid do not directly contact does not mean a completely separated state between the dry fluid and the high-humidity fluid, but means a state in which a porous membrane is provided between the dry fluid and the high-humidity fluid and thus the dry fluid and the high-humidity fluid may not be freely mixed with each other.

The structure of the fluid exchange membrane module may be controlled according to the type of the fluid exchange membrane.

In one embodiment, if the fluid exchange membrane is a porous membrane which is a hollow fiber membrane, a fluid exchange membrane module may be configured such that one of two kinds of fluids passes through hollows of hollow fibers and another one passes through spaces between hollow fibers of a hollow fiber bundle.

Figure 1:
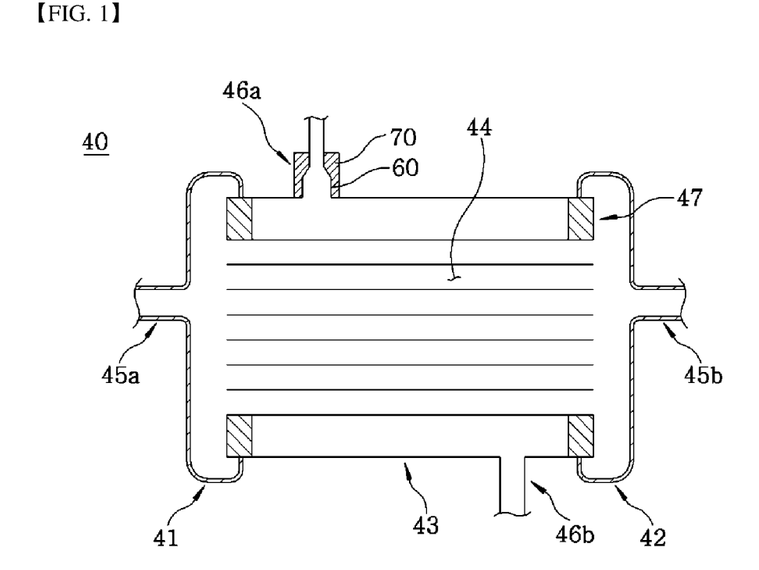
FIG. 1 is a cross-sectional view schematically illustrating a fluid exchange membrane module in accordance with one embodiment of the present invention.

As exemplarily shown in FIG. 1, a fluid exchange membrane module 40 includes an inlet case 41 provided with a fluid inlet 45a, an outlet case 42 provided with a fluid outlet 45b, and a connection case 43 provided with a fluid inlet 46a and a fluid outlet 46b, and has a structure in which the inlet case 41 and the outlet case 42 are connected by the connection case 43. Further, the fluid exchange membrane module 40 may have a structure in which one end of the hollow fiber bundle in the length direction P is located at the inlet case 41 and the other end is located at the outlet case 42.

The connection case 43 may include potting parts 47 at both ends of the connection case 43 so as to fix the hollow fiber bundle, as exemplarily shown in FIG. 1. The potting parts 47 bind the hollow fiber bundle and fill pores between the hollow fibers of the hollow fiber bundle so as to prevent a fluid passing through the spaces between the hollow fibers from being introduced into the hollows of the hollow fibers. The potting parts 47 may be formed of any material which may be used generally without limit.

The fluid exchange membrane module 40 is not limited to the above-described structure and structures, which modules using hollow fiber membrane-type porous membranes may employ, may be properly used.

Figure 2:
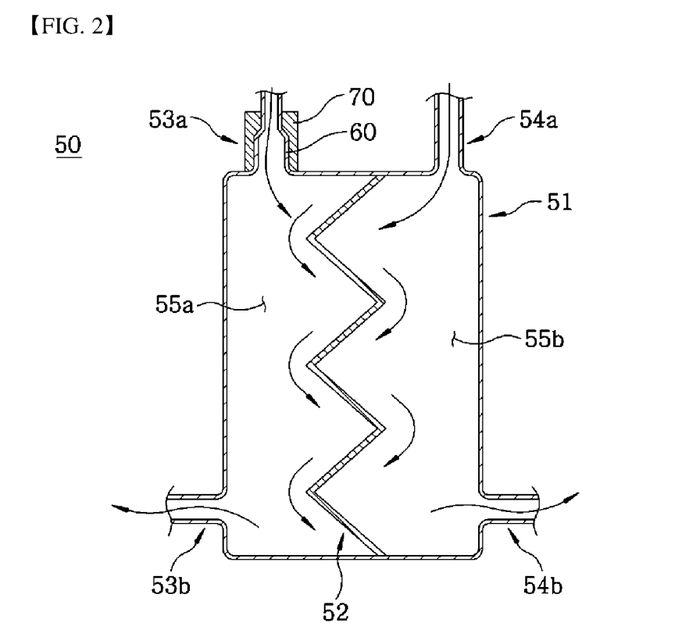
FIG. 2 is a cross-sectional view schematically illustrating a fluid exchange membrane module in accordance with another embodiment of the present invention.

In another embodiment, if the fluid exchange membrane is a porous membrane which is a flat sheet membrane, as exemplarily shown in FIG. 2, a fluid exchange membrane module may be configured such that the flat sheet membrane is provided between two kinds of fluids and thus the fluids flow along opposite surfaces of the flat sheet membrane.

As exemplarily shown in FIG. 2, a fluid exchange membrane module 50 includes a case 51 having an inner space 55 and a structure in which two pairs of fluid inlets 53a and 54a and fluid outlets 53b and 54b are formed on the surface of the fluid exchange membrane module 50 so as to supply fluids to the inner space 55 from the outside of the case 51 and to discharge the fluids to the outside of the case 51 from the inner space 55. Further, the fluid exchange membrane module 50 may include a fluid exchange membrane 52, the circumference of which contacts the inner wall of the case 51 so as to divide the inner space 55 of the case 51 into two sub-spaces. The fluid exchange membrane 52 may include corrugation, i.e., the fluid exchange membrane 52 may be corrugated and thus a contact area of the fluid exchange membrane 52 may be increased. Here, the fluid exchange membrane 52 may be disposed within the case 51 such that one sub-space 55a of the two divided sub-spaces of the inner space 55 is connected to a pair of the fluid inlet 53a and the fluid outlet 53b and the other sub-space 55b is connected to another pair of the fluid inlet 54a and the fluid outlet 54b. Thereby, the fluid exchange membrane module 50 may be configured so as to prevent direct contact between the two kinds of fluids due to the fluid exchange membrane 52 and to enable exchange of fluid, such as moisture, between the two kinds of fluids. In this specification, the term "division of a space into two sub-spaces" means division of one space into two sub-spaces and does not require that the sizes or areas of the two sub-spaces are the same, and is thus distinguished from the term "bisection".

The fluid exchange membrane module 50 including the flat sheet membrane as the fluid exchange membrane is not limited to the above-described structure and structures, which modules using flat sheet membrane-type porous membranes may employ, may be properly used.

The fluid exchange membrane modules 40 and 50 have excellent fluid exchange performance, for fluids such as moisture, between two or more kinds of fluids and are thus applicable to various fields. The fluid exchange membrane modules 40 and 50 may be used as, for example, a moisture exchange module, a heat exchange module, a gas separation module or a water treatment module.

In one example, the fluid exchange membrane modules 40 and 50 may be applied as a humidification module of a fuel cell. The fluid exchange membrane modules 40 and 50 may be used a humidification module of a fuel cell by employing a method which is well known in the art. Further, the structures of the fluid exchange membrane modules 40 and 50 may be properly controlled according to capacities of the fuel cell. For example, in a fuel cell system of a high capacity of 100 kW or more requiring high integration, a module to which a hollow fiber membrane is applied as a porous membrane may be used. Hereinafter, the fluid exchange membrane module 40 to which a hollow fiber membrane is applied as a porous membrane will be described.

The fluid exchange membrane module 40 includes a diffuser 60 at at least one of the fluid inlets 45a and 46a. Although FIG. 1 illustrates one fluid inlet 45a alone as including the diffuser 60, the present invention is not limited thereto and another fluid inlet 46a may also include the diffuser 60 or another fluid inlet 46a alone may include the diffuser 60. Further, although FIG. 1 illustrates the diffuser 60 as contacting the connection case 43, the present invention is not limited thereto and the diffuser 60 may be installed at pipes connected to the fluid inlets 45a and 46a. FIG. 2 illustrates one fluid inlet 53a of the fluid exchange membrane module 50 as including a diffuser 60.

In general, a humidification module of a fuel cell uses a high-temperature and high-humidity fluid discharged from the fuel cell as a moisture supply source. Even though an absolute humidity of the high-temperature and high-humidity fluid (an amount of moisture included in air of a unit volume) is not changed, if a relative humidity of the high-temperature and high-humidity fluid is increased by lowering the temperature of the high-temperature and high-humidity fluid, moisture transmission efficiency may be increased due to increase in the relative humidity of the high-temperature and high-humidity fluid around the surface of the fluid exchange membrane 44.

In order to lower the temperature of the high-temperature and high-humidity fluid, a separate device, such as a heat exchanger, may be used but, in the present invention, such an object is achieved through the diffuser 60 not the separate device. The diffuser 60 causes sudden adiabatic expansion of the high-temperature and high-humidity fluid and allows the high-temperature and high-humidity fluid to use intrinsic energy thereof as work, thus lowering the temperature of the high-temperature and high-humidity fluid based on the first law of thermodynamics. When the temperature of the high-temperature and high-humidity fluid is lowered, a saturated humidity at the corresponding temperature is lowered and thus a relative humidity is raised.

Therefore, the diffuser 60 may raise the relative humidity of the high-temperature and high-humidity fluid and thus maximize fluid transmission through the fluid exchange membrane 44. Further, without addition of a separate device, such as a heat exchanger, to acquire the above effects, the effects may be achieved using a simple member, such as the diffuser 60, or by changing the shape of a flow path.

Further, the diffuser 60 may lower the pressure of the fluid through expansion of the fluid, thus uniformizing pressure distribution of the fluid within the inlet case 41 or the connection case 43. Thereby, the fluid may uniformly contact the entirety of the fluid exchange membrane 44 and decrease of efficiency of the fluid exchange membrane module 40 due to conventional contact of the fluid with only a part of the fluid exchange membrane 44 may be overcome.

Figure 3:
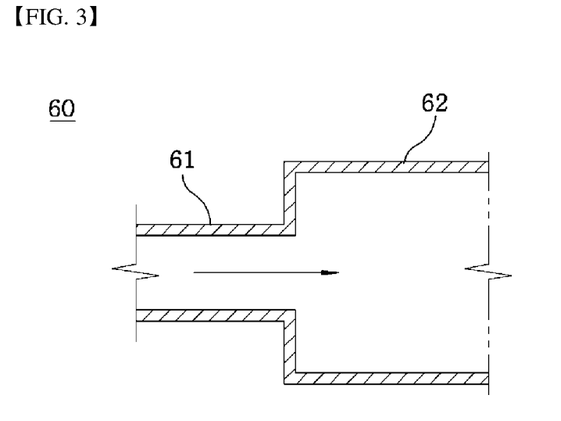
FIGS. 3 to 7 are cross-sectional views illustrating diffusers in accordance with different embodiments.

FIG. 3 is a cross-sectional view of a diffuser 60 in accordance with one embodiment. In FIG. 3, an arrow indicates a flow direction of a fluid. With reference to FIG. 3, the diffuser 60 includes a first inner diameter part 61 and a second inner diameter part 62 having different inner diameters. The first inner diameter part 61 is disposed at an upstream region of a fluid flow, the second inner diameter part 62 is disposed at a downstream region of the fluid flow, the inner diameter of the second inner diameter part 62 is greater than the inner diameter of the first inner diameter part 61. When the fluid flows in the first inner diameter part 61 of the diffuser 60 and is then introduced into the second inner diameter part 62, the fluid suddenly expands and the temperature of the fluid is lowered.

Figure 4:
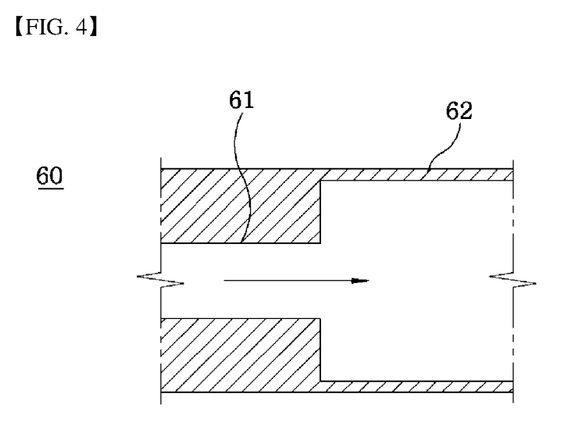

FIG. 4 is a cross-sectional view of a diffuser 60 in accordance with another embodiment. The diffuser 60 shown in FIG. 3 is configured such that the outer diameters as well as the inner diameters of the first inner diameter part 61 and the second inner diameter part 62 are different, but the diffuser 60 shown in FIG. 4 may be configured such that the outer diameters of a first inner diameter part 61 and a second diameter part 62 are the same.

The ratio of the inner diameter of the second inner diameter part 62 to the inner diameter of the first inner diameter part 61 may be 2:1 to 20:1, preferably 3:1 to 10:1, more preferably 5:1 to 8:1. If the inner diameter of the first inner diameter part 61 is less than 1/20 the inner diameter of the second inner diameter part 62, fluid flow resistance may be increased due to excessive pressure loss and thus cause overload of an air supply device and, if the inner diameter of the first inner diameter part 61 exceeds 1/2 the inner diameter of the second inner diameter part 62, the effects of adiabatic expansion to be achieved by the present invention may be eliminated.

Figure 5:
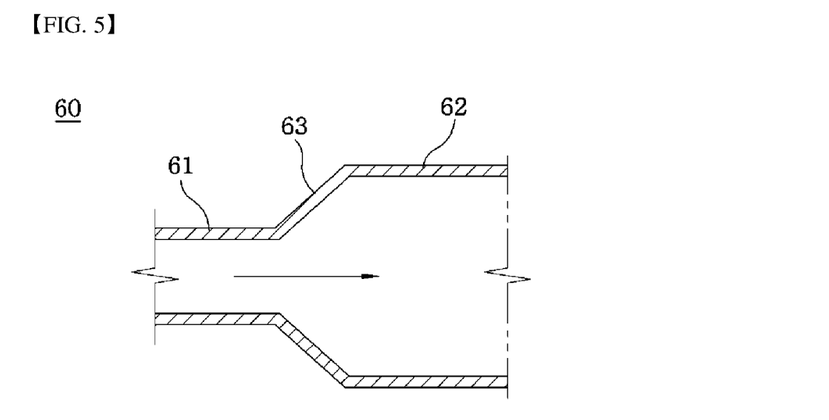

FIG. 5 is a cross-sectional view of a diffuser 60 in accordance with another embodiment. With reference to FIG. 5, the diffuser 60 includes an inner diameter extension part 63 located between a first inner diameter part 61 and a second inner diameter part 62. The inner diameter of the inner diameter extension part 63 may be gradually increased from the inner diameter of the first inner diameter part 61 to the inner diameter of the second inner diameter part 62. That is, the inner diameter of the inner diameter extension part 63 is gradually increased in the flow direction of the fluid. If the diffuser 60 further includes the inner diameter extension part 63, the fluid is more slowly expanded and thus, energy loss caused by sudden expansion of the fluid may be reduced.

Figure 6:
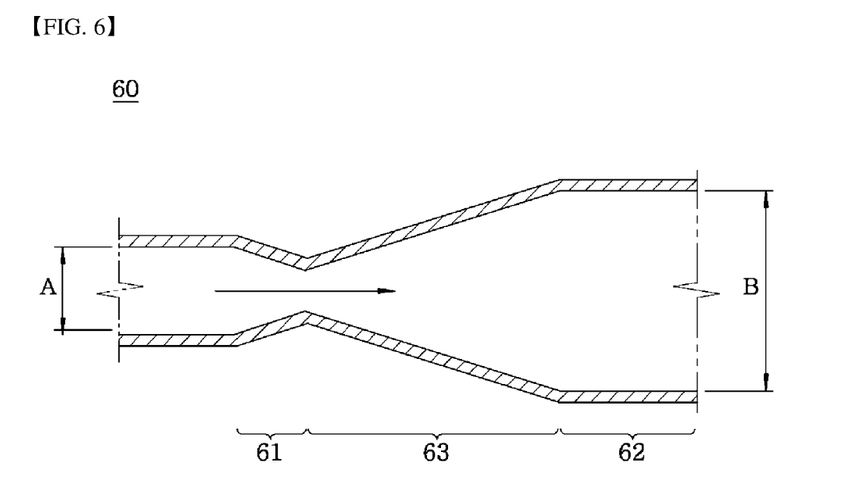

FIG. 6 is a cross-sectional view of a diffuser 60 in accordance with another embodiment. With reference to FIG. 6, the diffuser 60 may have a Venturi tube shape. That is, the inner diameter of a first inner diameter part 61 is gradually decreased in the flow direction of a fluid, and an inner diameter extension part 63 is configured such that one end of the inner diameter extension part 63 is connected to an end of the first inner diameter part 61 having the smallest inner diameter, the inner diameter of the inner diameter extension part 63 is gradually increased and the other end of the inner diameter extension part 63 is connected to a second inner diameter part 62. If the inner diameter of the first inner diameter part 61 is gradually decreased, the diffuser 60, which may maintain the inner diameter of a pipe connected to the first inner diameter part 61 and the inner diameter of the second inner diameter part 62 to be the same and expand the fluid, may be installed.

Here, a length at which the inner diameter of the first inner diameter part 61 is gradually decreased may be shorter than a length at which the inner diameter of the inner diameter extension part 63 is gradually increased. In more detail, the ratio of the length at which the inner diameter of the inner diameter extension part 63 is gradually increased to the length at which the inner diameter of the first inner diameter part 61 is gradually decreased may be 1:1 to 10:1, preferably 2:1 to 7:1, more preferably 3:1 to 5:1. If the ratio of the length at which the inner diameter of the inner diameter extension part 63 is gradually increased to the length at which the inner diameter of the first inner diameter part 61 is gradually decreased is less than 1:1, the effects of adiabatic expansion may not be acquired and, if the length at which the inner diameter of the inner diameter extension part 63 is gradually increased exceeds 10 times the length at which the inner diameter of the first inner diameter part 61 is gradually decreased, the above shaped configuration may not be implemented in a restricted space and thus spatial constraint may occur. Here, the lengths are lengths in the flow direction of the fluid.

Figure 7:
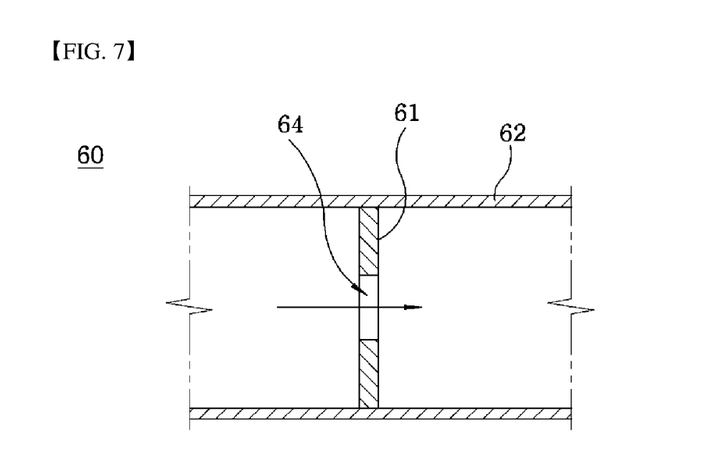
Figure 8:
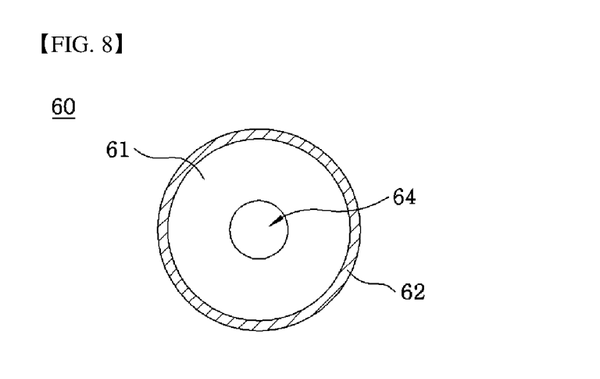
FIGS. 8 and 9 are plan views illustrating first inner diameter parts having an orifice plate shape.
Figure 9:
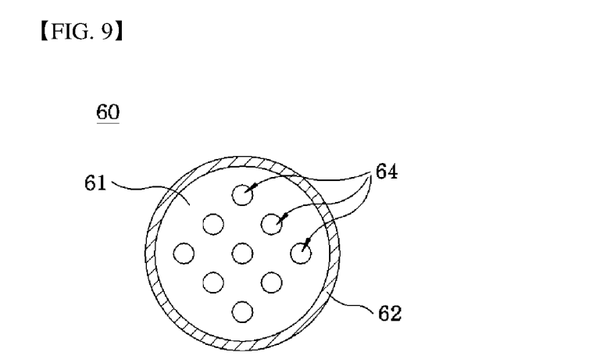

FIG. 7 is a cross-sectional view of a diffuser 60 in accordance with another embodiment. With reference to FIG. 7, a first inner diameter part 61 includes a plate provided with at least one opening 64. That is, the first inner diameter part 61 may have an orifice plate shape. FIGS. 8 and 9 are plan views illustrating first inner diameter parts having an orifice plate shape. With reference to FIGS. 8 and 9, the first inner diameter part 61 includes at least one opening 64. Here, the ratio of the inner diameter of a second inner diameter part 62 to the diameter of the opening 64 may be 3:1 to 30:1, preferably 5:1 to 20:1, more preferably 8:1 to 15:1. If the inner diameter of the second inner diameter part 62 is less than 3 times the diameter of the opening 64, sudden expansion of a fluid may not be caused and, if the inner diameter of the second inner diameter part 62 exceeds 30 times the diameter of the opening 64, the size of the opening 64 is excessively decreased and may thus act as an excessively large resistance and pressure loss is excessively increased.

Figure 10:
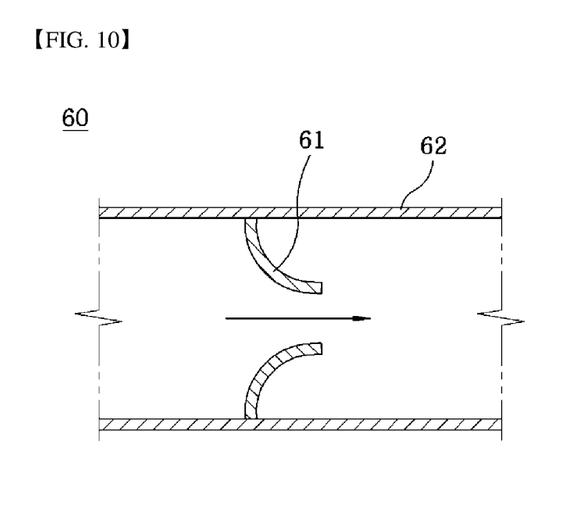
FIG. 10 is a cross-sectional view illustrating a diffuser in accordance with another embodiment.

FIG. 10 is a cross-sectional view of a diffuser 60 in accordance with yet another embodiment. With reference to FIG. 10, a first inner diameter part 61 may be of a nozzle type. That is, the first inner diameter part 61 may be configured such that the inner diameter thereof is gradually increased in the flow direction of a fluid.

The fluid exchange membrane module 40 may further include an adiabatic member 70 to thermally insulate the diffuser 60. If the diffuser 60 is thermally insulated, the fluid expanding through the diffuser 60 may adiabatically expand.

If the fluid adiabatically expands, the temperature of the fluid may be more lowered and thus the relative humidity of the fluid may be more increased. As the adiabatic member 70, all thermal insulators which are conventionally used and, in more detail, organic thermal insulators, such as cork, cotton, felt, carbonized cork, foam rubber, etc., or inorganic thermal insulators, such as asbestos, glass wool, quartz wool, diatomite, magnesium carbonate powder, magnesia powder, calcium silicate, perlite, etc., but the present invention is not limited thereto.

MODE FOR INVENTION

Test Examples

Manufacture of Humidification Module

Comparative Example 1

A bundle of 14,000 polysulfone hollow fiber membranes (having an outer diameter 900 μm and an inner diameter of 800 μm) was disposed within a square connection case (having a horizontal length of 250 mm, a vertical length of 250 mm, and a height of 500 mm).

Both ends of the connection case were covered with caps for forming potting parts, and a composite for potting was injected into spaces between the hollow fiber membranes and a space between the bundle of the hollow fiber membranes and the connection case and then hardened so as to seal the inside of the connection case. After the caps for forming potting parts were removed, ends of the hardened composite for potting were cut so that ends of the bundle of the hollow fiber membranes are exposed from the cut ends of the composite for potting, thereby forming potting parts. Then, both ends of the connection case were covered with an inlet case and an outlet case, thereby manufacturing a humidification module.

Test Example 1

A bundle of 14,000 polysulfone hollow fiber membranes (having an outer diameter 900 μm and an inner diameter of 800 μm) was disposed within a square connection case (having a horizontal length of 250 mm, a vertical length of 250 mm, and a height of 500 mm).

Both ends of the connection case were covered with caps for forming potting parts, and a composite for potting was injected into spaces between the hollow fiber membranes and a space between the bundle of the hollow fiber membranes and the connection case and then hardened so as to seal the inside of the connection case. After the caps for forming potting parts were removed, ends of the hardened composite for potting were cut so that ends of the bundle of the hollow fiber membranes are exposed from the cut ends of the composite for potting, thereby forming potting parts. Then, both ends of the connection case were covered with an inlet case and an outlet case, thereby manufacturing a humidification module.

Here, a diffuser including a first inner diameter part having an inner diameter of 10 mm and a second inner diameter part having an inner diameter of 50 mm was installed at a fluid inlet of the connection case.

Comparative Example 2

A polysulfone flat sheet membrane (having a horizontal length of 250 mm and a vertical length of 250×100 mm) was disposed within a square connection case (having a horizontal length of 250 mm, a vertical length of 250 mm, and a height of 500 mm) so as to divide the inside of the connection case into two parts. Both ends of the connection case were covered with an inlet case and an outlet case, thereby manufacturing a humidification module.

Test Example 2

A polysulfone flat sheet membrane (having a horizontal length of 250 mm and a vertical length of 250×100 mm) was disposed within a square connection case (having a horizontal length of 250 mm, a vertical length of 250 mm, and a height of 500 mm) so as to divide the inside of the connection case into two parts. Both ends of the connection case were covered with an inlet case and an outlet case, thereby manufacturing a humidification module.

Here, a diffuser including a first inner diameter part having an inner diameter of 10 mm and a second inner diameter part having an inner diameter of 50 mm was installed at a fluid inlet of the connection case.

[Test: Measurement of Performance of Manufactured Potting Parts]

Dry air was supplied at 50 g/sec to the fluid inlets of the inlet cases of the humidification modules manufactured by the test examples and comparative examples, and high-temperature and high-humidity air at a temperature of 80° C. and a relative humidity of 60% was supplied to the fluid inlets of the connection cases of the humidification modules, thereby executing gas-gas humidification.

Humidification performance was measured by measuring the temperature and humidity of a point, from which dry air is humidified and discharged, and converting those into a dew point, and acquired results are stated in Table 1 below.

TABLE 1

| Division | Comparative Example 1 | Test Example 1 | Comparative Example 2 | Test Example 2 |
|---|---|---|---|---|
| Humidification performance (° C.) | 54 | 61 | 48 | 53 |

With reference to Table 1, it may be understood that the humidification modules manufactured by the test examples have excellent humidification efficiency, as compared to the humidification modules manufactured by the comparative examples.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS AND MARKS 40 fluid exchange membrane module
41 inlet case
42 outlet case
43 connection case
44 fluid exchange membrane
45a fluid inlet
45b fluid outlet
46a fluid inlet
46b fluid outlet
47 potting part 50 fluid exchange membrane module
51 case
52 fluid exchange membrane
53a fluid inlet
53b fluid outlet
54a fluid inlet
54b fluid outlet
55 inner space
55a one of sub-spaces acquired by division
55b the other of sub-spaces acquired by division
60 diffuser
61 first inner diameter part
62 second inner diameter part
63 inner diameter extension part
64 opening
70 adiabatic member

INDUSTRIAL APPLICABILITY

The present invention relates to a fluid exchange membrane module, and more particularly to a fluid exchange membrane module which may maximize fluid transmission through a fluid exchange membrane simply by including a simple member or changing the shape of a flow path, and uniformize pressure distribution of a fluid flow.

The fluid exchange membrane module may be used as a moisture supply module, a heat exchange module, a gas separation module or a water treatment module.

The invention claimed is:

1. A fluid exchange membrane module comprising
a case including at least two pairs of fluid inlets and fluid outlets, the at least two pairs comprising a first pair of a first fluid inlet and a first fluid outlet and a second pair of a second fluid inlet and a second fluid outlet,
a fluid exchange membrane installed within the case and disposed so that a dry fluid flowing between the first fluid inlet and the first fluid outlet does not directly contact a high-humidity fluid flowing between the second fluid inlet and the second fluid outlet in the operating state of the fluid exchange membrane module, wherein among the at least two pairs of fluid inlets and fluid outlets, only the first fluid inlet to introduce the high-humidity fluid into the fluid exchange membrane module therethrough includes a diffuser, and
an adiabatic member configured to thermally insulate the diffuser.

2. The fluid exchange membrane module according to claim 1, wherein the diffuser is installed at a pipe connected to the first fluid inlet.

3. The fluid exchange membrane module according to claim 1, wherein the diffuser includes a first inner diameter part and a second inner diameter part having different inner diameters.

4. The fluid exchange membrane module according to claim 3, wherein the inner diameter of the second inner diameter part is greater than the inner diameter of the first inner diameter part.

5. The fluid exchange membrane module according to claim 3, wherein the first inner diameter part is disposed at an upstream region of a fluid flow and the second inner diameter part is disposed at a downstream region of the fluid flow.

6. The fluid exchange membrane module according to claim 3, wherein the ratio of the inner diameter of the second inner diameter part to the inner diameter of the first inner diameter part is 2:1 to 20:1.

7. The fluid exchange membrane module according to claim 3, wherein the diffuser further includes an inner diameter extension part located between the first inner diameter part and the second inner diameter part.

8. The fluid exchange membrane module according to claim 7, wherein the inner diameter of the inner diameter extension part is gradually increased from the inner diameter of the first inner diameter part to the inner diameter of the second inner diameter part.

9. The fluid exchange membrane module according to claim 8, wherein the diffuser has a Venturi tube shape.

10. The fluid exchange membrane module according to claim 9, wherein the inner diameter of the first inner diameter part is gradually decreased.

11. The fluid exchange membrane module according to claim 10, wherein the ratio of a length at which the inner diameter of the inner diameter extension part is gradually increased to a length at which the inner diameter of the first inner diameter part is gradually decreased is 1:1 to 10:1.

12. The fluid exchange membrane module according to claim 3, wherein the first inner diameter part is an orifice plate.

13. The fluid exchange membrane module according to claim 12, wherein:
the orifice plate includes a plate including at least one opening; and
the ratio of the inner diameter of the second inner diameter part to the diameter of the opening is 3:1 to 30:1.

14. The fluid exchange membrane module according to claim 3, wherein the first inner diameter part is a nozzle.

15. The fluid exchange membrane module according to claim 14, wherein the inner diameter of the first inner diameter part is gradually decreased.

16. The fluid exchange membrane module according to claim 1, wherein the fluid exchange membrane is formed as a hollow fiber membrane, and the case and the fluid exchange membrane are disposed such that the dry fluid flows through hollows of the hollow fiber membrane and the high-humidity fluid flows outside the hollow fiber membrane.

17. The fluid exchange membrane module according to claim 16, wherein:
the case includes an inlet case provided with the first fluid inlet, an outlet case provided with the first fluid outlet, and a connection case provided with the second fluid inlet and the second fluid outlet;
the case has a connection structure in which the inlet case and the outlet case are connected by the connection case; and
hollow fibers are disposed within the case such that one end of each of the hollow fibers in the length direction is located at the inlet case and the other end of each of the hollow fibers is located at the outlet case.

18. The fluid exchange membrane module according to claim 17, in which potting parts to fix the hollow fibers are installed at both ends of the connection case.

19. The fluid exchange membrane module according to claim 1, wherein the fluid exchange membrane is formed as a flat sheet membrane, and the case and the fluid exchange membrane are disposed such that the dry fluid flows along one surface of the flat sheet membrane and the high-humidity fluid flows along the other surface of the flat sheet membrane.

20. The fluid exchange membrane module according to claim 19, wherein:
the case has an inner space formed therein and is provided with the at least two pairs of fluid inlets and fluid outlets so that fluids are supplied from the outside of the case to the inner space and the fluids are discharged from the inner space to the outside of the case; and the fluid exchange membrane is disposed within the case such that the circumference of the flat sheet membrane contacts the inner wall of the case so as to divide the inner space of the case into two sub-spaces, one sub-space of the two sub-spaces is connected to the first fluid inlet and the first fluid outlet and the other sub-space is connected to another pair of the second fluid inlet and the second fluid outlet.

21. The fluid exchange membrane module according to claim 1, wherein the fluid exchange membrane module is any one of selected from the group consisting of a moisture supply module, a heat exchange module, a gas separation module and a water treatment module.

22. The fluid exchange membrane module according to claim 1, wherein the fluid exchange membrane module does not include a heat exchanger.

* * * * *